United States Patent Office 2,771,458
Patented Nov. 20, 1956

2,771,458

SOLUTIONS OF RUBBERY POLYMERS FROM PARTICLES OF UNIFORM DIAMETER

Carll F. Van Gilder, Roselle, and William C. Harney, Elizabeth, N. J., assignors to Esso Research and Engineering Company, a corporation of Delaware No Drawing. Application January 5, 1953,
Serial No. 329,728

11 Claims. (Cl. 260—33.6)

This invention relates to solutions of high molecular weight polymers and more particularly to the production of solutions of high polymer content which are homogeneous and lump free, and is a continuation in part of application Serial No. 114,904 filed September 9, 1949, now U. S. Patent 2,628,203.

Dilute solutions of rubbery polymers are usually prepared by stirring the polymer into solvents such as ether, benzene, carbon tetrachloride, carbon disulfide, naphtha, oils, waxes, and the like, until a homogeneous solution is obtained. Such solutions seldom contain more than 1% of polymer.

In many cases it is desirable to obtain the maximum possible polymer content consistent with a viscosity which will permit satisfactory use of the solution. In order that a large amount of polymer may be incorporated into a given solvent, it has been necessary to subject the polymer to a long and sometimes severe milling operation or to mastication with heavy duty direct action mixing equipment, such as kneaders, banburys, or extruders. Excessive milling is sometimes extremely harmful to the polymer, tending to break it down so that the final product is of very inferior quality and much of its desirable qualities are lost. Furthermore, heavy equipment is expensive initially, the power requirements are large and general batch sizes are limited, all of which result in increased blending costs.

A characteristic property of rubbery polymers is that they swell gradually in the solvent which penetrates the aggregate from the surface into the center at which point the polymer is completely dispersed. However, as the solvent viscosity increases the rate of solvent penetration decreases to such an extent that some of the large particles of the aggregate are not completely attacked and the final blend contains lumps of partially swollen polymer or "fish eyes" and the blend is not homogeneous. In preparing blends of high molecular weight polymer wherein the final viscosity is above 5000 centistokes at 210° F., the usual type of crumb aggregate will cause non-homogeneous and lumpy blends unless long and severe agitation with heavy equipment is resorted to. Because of the high viscosities involved, it is not feasible to filter or strain the blends to remove the lumps. Accordingly, for blends above 5000 centistokes positive action mixing equipment is required.

According to the present invention, it has been found that if the size of the polymer particles which are being dissolved are maintained uniform and below ¼ inch in diameter, preferably at about ⅟₁₆ inch ±⅟₆₄ inch, that high viscosity blends which are homogeneous and lump-free can be obtained by simple agitation.

The desired polymer particle sizes which are useful according to the present invention can be obtained in any manner known to the art. However, it has been found that extrusion through a nozzle having a bore of the desired diameter and provided with a slicer adapted to cut off pellets of uniform size is a particularly desirable method of obtaining particles of uniform size.

The following table gives data showing the advantages of the use of small uniform particle sizes of the present invention over larger sizes and non-uniform crumb particles when dissolved in paraffin wax melting at 132° F.

TABLE 1

Solution rates of polyisobutylene in wax 132° F. M. P. at 230° F.

[10% polymer–90% wax.]

| Type | ⅟₁₆ in. Pellets | ⅟₁₆ in. Pellets | ⅗₁₆ in. Pellets | Crumb | Crumb |
|---|---|---|---|---|---|
| M. W. | 115,000 | 71,000 | 100,000 | 91,200 | 115,000 |
| | Percent Polymer Dissolved at Hrs. | | | | |
| Time, Hrs.: | | | | | |
| 1 | 4.1 | 3.2 | 0.7 | 2.4 | 2.6 |
| 2 | 6.7 | 6.0 | 1.5 | 4.4 | 4.7 |
| 3 | 8.5 | 8.3 | 2.1 | 6.3 | 6.5 |
| 4 | 9.5 | 9.7 | 2.7 | 7.6 | 7.6 |
| 5 | 10.0 | 10.0 | | 8.5 | 8.4 |
| 6 | | | | | 8.6 |
| 48 | | | 4.4 | | |
| 65 | | | | 9.3 | |

From the above data it is apparent that the ⅟₁₆ inch pellets dissolved many times faster than the ⅗₁₆ inch pellets and reached a maximum concentration of 10% within five hours whereas after 48 hours only 4.4% of the ⅗₁₆ inch pellets was dissolved. The crumb polymer dissolved somewhat faster than the ⅗₁₆ inch pellets due to the fact that the crumb contained many small particles, yet only 9.3% was dissolved after 65 hours. Furthermore, the resulting solution from the crumb polymer was lumpy while that from the ⅟₁₆ inch pellets was homogeneous.

As a further illustration data are given in Table 2 showing the viscosity of solutions prepared at various polymer contents of pelletized 94,000 molecular weight polyisobutylene in 132° F. M. P. wax.

TABLE 2

Solution rate of polyisobutylene pellets (⅟₁₆") 94,000 M. W. in 132° F. M. P. wax

[Solution temp. 130–150° C.]

| Percent Polymer | Time, Hrs. | cs. @ 210° F.[1] | Remarks |
|---|---|---|---|
| 20 | 1 | 543 | Lumpy. |
| 17 | 1 | 257 | Slightly lumpy. |
| 16 | 3¾ | 238 | No lumps. |
| 14 | 2¼ | 144 | Do. |

[1] After dilution of blend 1 part with 3 parts of wax.

The above data show that up to 16% polymer can be dissolved in wax in 3¾ hours to give a lump-free solution having a viscosity of better than 40,000 centistokes at 210° F. before dilution which represents a saving in polymer of 10–20% over that necessary to produce equivalent viscosity by positive action equipment.

The following tables give data showing the advantages of the use of small uniform particle sizes of the present invention over larger sizes and non-uniform crumb particles when dissolved in lubricating oil.

TABLE 3

*Solution rates and viscosities for 6 wt. percent blends of 83,000 mol. wt. mm. polyisobutylene in lubricating oil*

| Hrs. Stirring Time @ 300° F. | 1/16" Pellets | | Crumb Particles | |
|---|---|---|---|---|
| | Cs. Vis. @ 210° F. | Percent Polymer Solvated | Cs. Vis. @ 210° F. | Percent Polymer Solvated |
| 1 | 153.4 | 40.0 | 41.0 | 20.8 |
| 2 | 2,204.0 | 88.5 | 125.0 | 38.0 |
| 3 | 3,500.0 | 98.5 | 429.2 | 58.0 |
| 4.5 | 3,700.0 | 100.0 | | |
| 6.5 | | | 2,682.0 | 91.8 |

From the above data it is apparent that 98.5% of the pelletized 1/16 inch polyisobutylene was dissolved in the lubricating oil after 3 hours stirring at 300° F. while only 58.0% of the crumb type polymer was dissolved in the same length of time.

TABLE 4

*Viscosities for lubricating oil solutions of 83,000 mol. wt. mm. polyisobutylene*

| Wt. Percent Polymer in Solution | Cs. Vis. @ 210° F. |
|---|---|
| 0.96 | 23.7 |
| 4.5 | 1,093.0 |
| 6.0 | 3,715.0 |
| 8.2 | 14,220.0 |

The above data show that up to 8.2% polymer can be dissolved in lubricating oil to give a solution having a viscosity of better than 14,000 centistokes at 210° F. before dilution.

Other modes of applying the principle of this invention may be employed, provided the features stated in the following claims, or the equivalent of such be employed. For example instead of the lubricating oil used in Tables III and IV any normally liquid hydrocarbon material can be used instead, e. g., naphtha, gasoline, kerosene, gas oil, white oil and the like. Furthermore the invention may be applied to any type of rubbery polymer which it is desired to dissolve, including natural rubber, the various synthetic rubbers, Buna-S (the copolymer of butadiene and styrene), Perbunan (the copolymer of butadiene and acrylonitrile), polyisobutylene, Butyl rubber (the copolymer of isobutylene and butadiene or isoprene), polyethylene and the like.

With the detailed disclosure above given, it is obvious that modifications will suggest themselves, for instance, other solvents than those listed may be used, also various compounding or filling substances, accelerators, antioxidants, and the like, without departing from the principle of the invention.

The solutions produced in accordance with this invention are useful for many purposes such as adhesives, impregnating materials, dipping or spreading cements, binders when mixed with wood flour, cork, etc. They are useful as waterproofing materials, coating compositions, and the like.

The nature and objects of the present invention having thus been set forth and specific examples of the same given, what is claimed as new and useful and desired to be secured by Letters Patent is:

1. A process for preparing substantially lump-free homogeneous solutions of polyisobutylene in a normally liquid hydrocarbon oil which comprises agitating polyisobutylene particles having a uniform diameter below 1/4 inch with the hydrocarbon oil at least until the viscosity of the resulting solution attains a value of at least about 3,500 centistokes at 210° F.

2. A process for preparing solutions of polyisobutylene in a lubricating oil which comprises agitating polyisobutylene particles having a uniform diameter below 1/4 inch with the lubricating oil at a temperature of about 300° F. at least until the viscosity of the resulting solution attains a minimum value of about 3,500 centistokes at 210° F.; said minimum value being obtained within a time not substantially exceeding about 3 hours, said solutions being substantially lump-free and homogeneous.

3. Process according to claim 2 in which the polyisobutylene particles are uniformly 1/16 inch in diameter.

4. A process for preparing substantially lump-free homogeneous solutions of high molecular weight rubbery polymers in lubricating oil which comprises agitating with the lubricating oil at a temperature of about 300° F., polymer particles selected from the group of rubbery polymers consisting of natural rubber, the copolymer, of butadiene and styrene, the copolymer of butadiene and acrylonitrile, polyisobutylene, polyethylene, and the copolymer of isobutylene and a diolefin selected from the group consisting of butadiene and isoprene, said polymer particles being of uniform size of not over 1/4 inch diameter; the agitation being until at least about 6.0 weight percent of the polymer is solvated and until the viscosity of the resulting solution attains a minimum value of at least about 3,500 centistokes at 210° F.

5. Process according to claim 2 in which the agitation is continued until at least about 6.0 weight percent of the polymer is solvated.

6. Process according to claim 4 in which said minimum value is obtained within a time not substantially exceeding about three hours.

7. A process for preparing solutions of polyisobutylene in a non-volatile hydrocarbon oil which comprises agitating polyisobutylene particles having a substantially uniform diameter of below 1/4 inch with the non-volatile hydrocarbon oil at least until the viscosity of the resulting solution reaches a value between about 3,700 and about 14,200 centistokes at 210° F.; between about 6.0 to 8.2% of said polyisobutylene being dissolved in said oil.

8. A process according to claim 7 in which the viscosity of 3,700 is obtained in a time not substantially exceeding about four and one-half hours.

9. Product produced by the process of claim 1.

10. Product produced by the process of claim 5.

11. Product produced by the process of claim 6.

References Cited in the file of this patent

UNITED STATES PATENTS 2,399,558    McArdle et al. _____ Apr. 30, 1946

FOREIGN PATENTS 650,088    Great Britain _____ Feb. 14, 1951